(12) United States Patent
Bauchot et al.

(10) Patent No.: US 8,040,244 B2
(45) Date of Patent: Oct. 18, 2011

(54) CLOSURE WITH PASSIVE ELECTRONIC SENSOR FOR TAMPER DETECTION AND RELATED METHOD

(75) Inventors: Frederic J. Bauchot, Saint-Jeannet (FR); Gerard Marmigere, Drap (FR); Joaquin Picon, St. Laurent du Var (FR); Pierre Secondo, Tourrette sur loup (FR)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/270,884

(22) Filed: Nov. 14, 2008

(65) Prior Publication Data
US 2010/0117797 A1     May 13, 2010

(51) Int. Cl.
*G08B 13/14* (2006.01)
(52) U.S. Cl. .................................. 340/572.8; 340/568.1
(58) Field of Classification Search ............... 340/572.8, 340/545.6, 568.1, 590, 591, 614, 626
See application file for complete search history.

(56) References Cited

U.S. PATENT DOCUMENTS

| 4,837,555 | A | * | 6/1989 | Millar | 340/568.8 |
| 7,017,807 | B2 | * | 3/2006 | Kipp et al. | 340/568.1 |
| 7,573,386 | B2 | * | 8/2009 | Lahiri | 340/568.1 |
| 7,652,575 | B2 | * | 1/2010 | Lyons et al. | 340/686.1 |
| 7,659,816 | B2 | * | 2/2010 | Wandel | 340/572.8 |
| 2002/0190865 | A1 | * | 12/2002 | Horibe et al. | 340/611 |
| 2006/0214789 | A1 | * | 9/2006 | Posamentier et al. | 340/545.6 |
| 2006/0238341 | A1 | | 10/2006 | Commagnac et al. | |
| 2007/0008121 | A1 | | 1/2007 | Hart | |

FOREIGN PATENT DOCUMENTS

| WO | 2005021400 A1 | 3/2005 |
| WO | 2006060945 A1 | 6/2006 |
| WO | 2006077230 A1 | 7/2006 |
| WO | 2007054449 A1 | 5/2007 |

* cited by examiner

*Primary Examiner* — John A Tweel, Jr.
(74) *Attorney, Agent, or Firm* — Jean M. Sullivan; Hoffman Warnick LLC

(57) ABSTRACT

A closure includes a closing member for sealing an opening of a pressurized container. The closing member may include a passive electronic sensor coupled thereto that includes a status register that may be readable by, for example, a RFID reader. The status register is responsive to a pressure change in the pressurized container caused by an insertion of the closing member into the opening or an extraction of the closing member from the opening. The status value in the status register indicates whether the pressurized container has been tampered with. An identification register may include a pressurized container identification encrypted with the private key of the manufacturer, which can be decrypted for comparing to identification on the pressurized container to identify tampering.

20 Claims, 5 Drawing Sheets

CLOSURE WITH PASSIVE ELECTRONIC SENSOR FOR TAMPER DETECTION AND RELATED METHOD

BACKGROUND

1. Technical Field

The disclosure relates generally to product tamper detection, and more particularly, to a closure and related method for pressurized container tamper detection employing a passive electronic sensor.

2. Background Art

Pressurized product containers may contain very expensive materials such as old wine, perfume or expensive engineered materials. In order to guarantee that the material in the pressurized container has not been corrupted, tamper detection systems are employed. In this manner, a purchaser of the product can be assured that the product is authentic.

BRIEF SUMMARY

A closure includes a closing member for sealing an opening of a pressurized container. The closing member may include a passive electronic sensor coupled thereto that includes a status register that may be readable by, for example, a RFID reader. The status register may be linked to a position of the closing member and responsive to a pressure change in the pressurized container caused by an insertion of the closing member into the opening or an extraction of the closing member from the opening. The status value in the status register indicates whether the pressurized container has been tampered with. An identification register may include a pressurized container identification encrypted with the private key of the manufacturer, which can be decrypted for comparing to identification on the pressurized container to identify tampering.

A first aspect of the disclosure provides a closure comprising: a closing member for sealing an opening of a pressurized container; and a passive electronic sensor coupled to the closing member, the sensor including a status register linked to a position of the closing member relative to the pressurized container.

A second aspect of the disclosure provides a method comprising: providing a closing member for sealing an opening of a pressurized container, the closing member including a passive electronic sensor coupled to the closing member, the passive electronic sensor including a status register linked to a position of the closing member relative to the pressurized container; registering in the status register a pressure change in the pressurized container caused by at least one of an insertion of the closing member into the opening or an extraction of the closing member from the opening; and reading the status register of the passive electronic sensor to determine whether the closing member has been tampered with.

A third aspect of the disclosure provides a closure comprising: a closing member for sealing an opening of a pressurized container; and a radio frequency identification (RFID) processor readable by a RFID reader, the RFID tag positioned within the closing member, the RFID processor including: a status register responsive to a pressure change in the pressurized container caused by at least one of a non-initial insertion of the closing member into the opening or an extraction of the closing member from the opening, and an identification register for storing a pressurized container identification that is to be identical to an identification assigned to the pressurized container.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
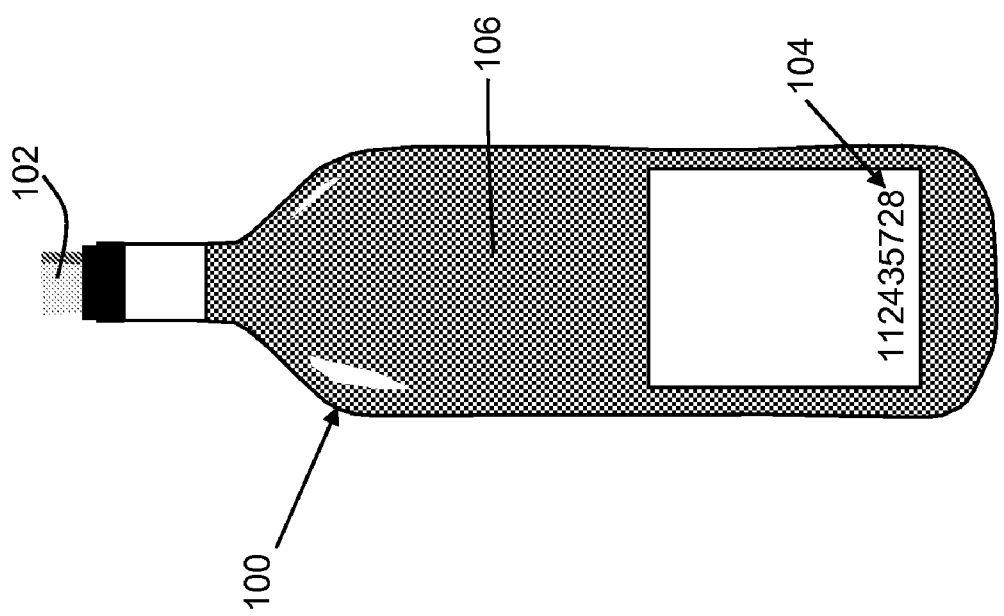
FIG. 1 shows a perspective view of an illustrative pressurized container include a closure according to embodiments of the invention.

Referring to the drawings, FIG. 1 shows a perspective view of an illustrative pressurized container 100 including a closure 102 (partially removed) according to embodiments of the invention. Pressurized container 100 is illustrated as a bottle such as might be used for wine or liquor. In this case, closure 102 may take the form of a cork. It is emphasized, however, that the teachings of the invention are not limited to this particular application. Rather, the teachings can be applied to any pressurized container and closure therefor. FIG. 1 also illustrates how many product containers include a container identification 104, which may include a numerical or alpha-numerical string, or other representation that can be corroborated to ensure authenticity. Pressurized container 100 may include material 106 in practically any form, e.g., liquid, solid, gel, gas, etc., or it could be empty.

Figure 2:
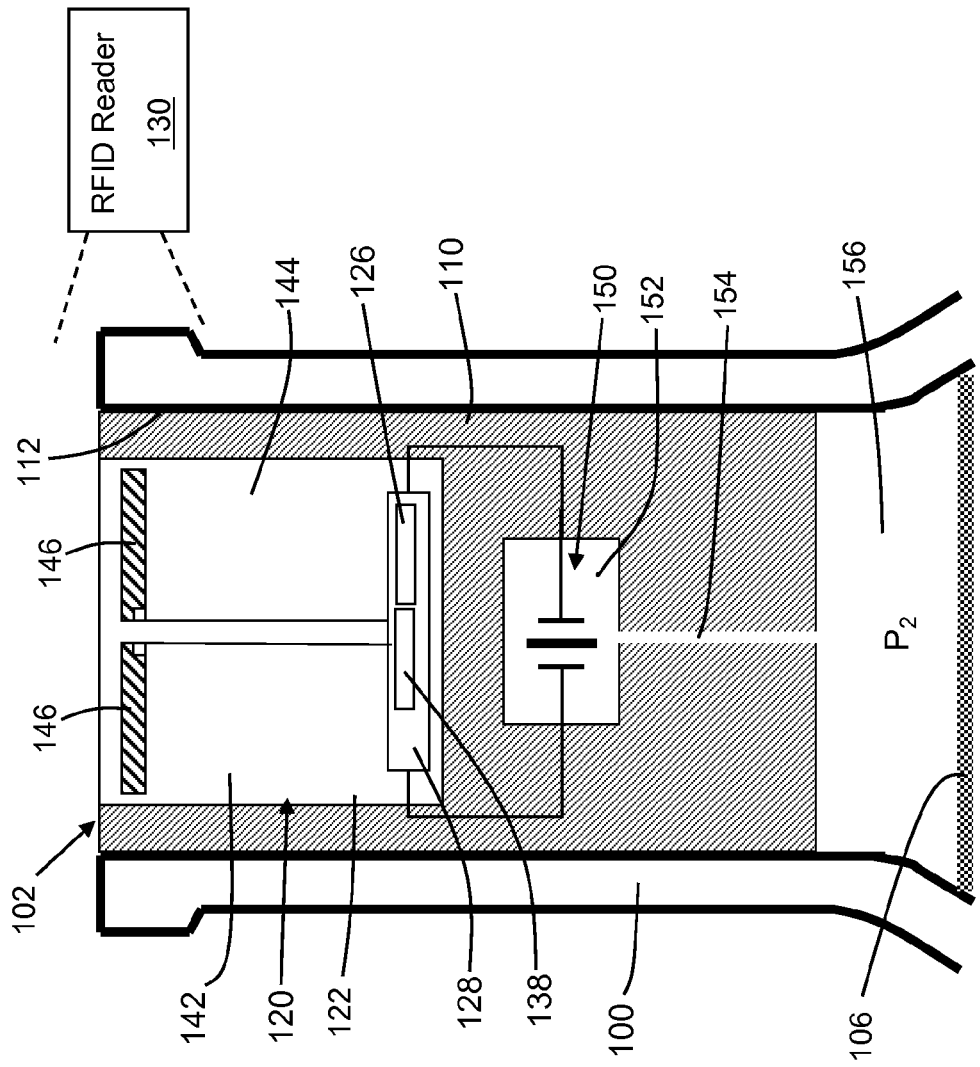
FIG. 2 shows a detailed cross-sectional view of one embodiment of the closure.

Turning to FIG. 2, closure 102 is illustrated inserted into pressurized container 100. As shown, closure 102 may include a closing member 110 for sealing an opening 112 of pressurized container 100. In the application shown, closing member 110 includes a cork sized to an interference fit with an interior of opening 112. It is understood, however, that closing member 110 may have a number of alternative configurations for sealing opening 112 in pressurized container 100. For example, closing member 110 may take the form of a threaded cap, a snap-on cap or any other type of member capable of sealing an opening to pressurized container 100. In addition, closing member 110 may be formed of any now known or later developed materials, e.g., cork, plastic, metal, etc.

Closing member 110 includes a passive electronic sensor 120 positioned within a cavity 122 thereof. Cavity 122 is shown in an upper portion of closing member 110 and having an open top for ease of illustration. Cavity 122 may be completely enclosed within closing member 110 and need not have the excess space surrounding passive electronic sensor 120. Passive electronic sensor 120 may be coupled to closing member 110 in any now known or later developed manner, e.g., glue, mechanical connection, formation of the material of closing member thereabout, etc.

Figure 3:
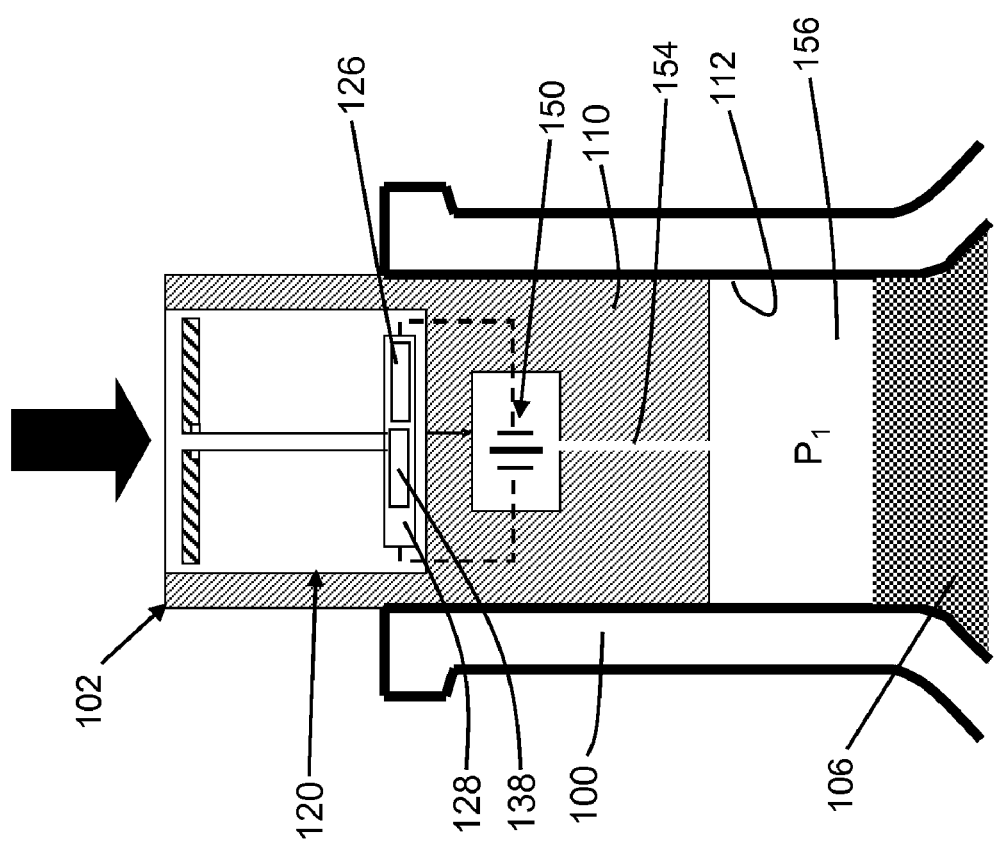
FIGS. 3-4 show detailed cross-sectional views of the closure during insertion and extraction, respectively.
Figure 4:
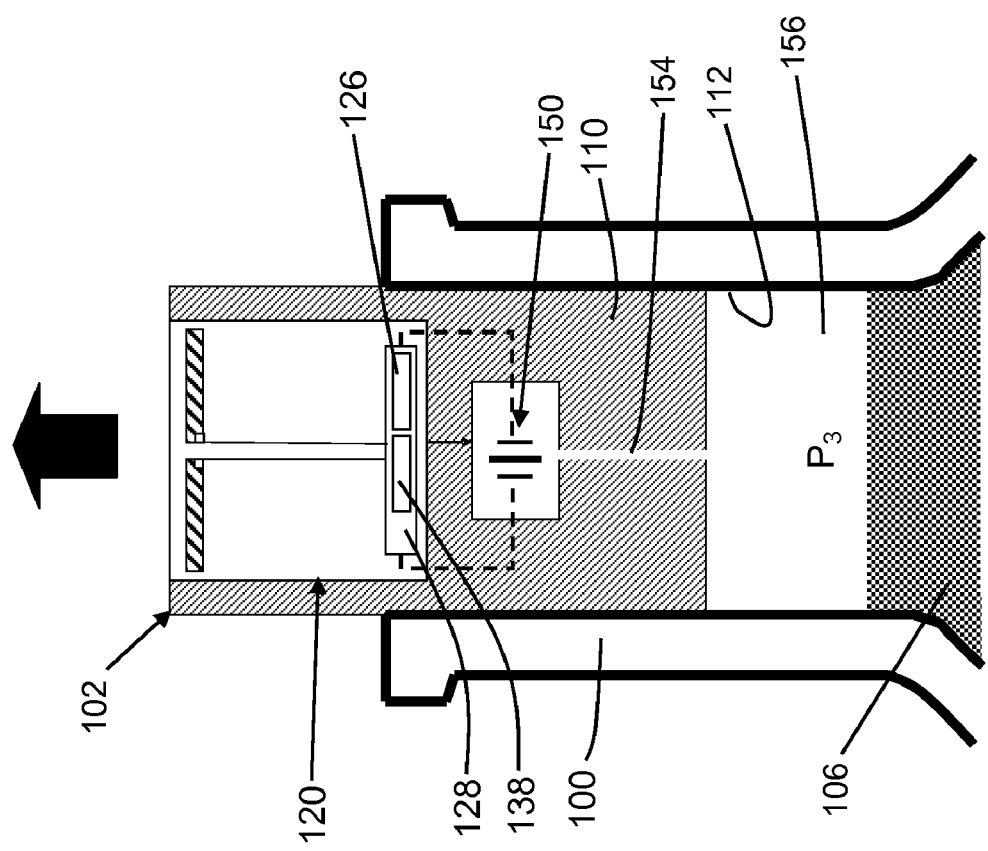

Passive electronic sensor 120 includes a status register 126 responsive to a pressure change in pressurized container 100 caused by an insertion of closing member 110 into opening 112, as shown in FIG. 3, or an extraction of closing member 110 from opening 112, as shown in FIG. 4. That is, status register 126 records the insertion and/or extraction of closing member 110 from pressurized container 100 in some manner. In addition, passive electronic sensor 120 may include an identification register 138 that stores an encrypted identification of pressurized container 100. In one embodiment, passive electronic sensor 120 includes a radio frequency identification (RFID) processor 128, including registers 126 and 138. Registers 126 and 138 are readable by a RFID reader 130 in a known fashion. RFID reader 130 may include any now known or later developed mechanism for powering sensor 120 and reading registers 126, 128 using radio waves.

Sensor 120 may be powered by an antenna 146 in a known fashion by RFID reader 130 for purposes of reading status register 126 and/or identification register 138, e.g., by receipt of an RF signal during reading of sensor 120. Sensor 120 may also be powered by a piezoelectric component 150 responsive to a pressure change in pressurized container 100 caused by an insertion or an extraction of closing member 110 from opening 112. Piezoelectric component 150 is positioned in a chamber 152 (discrete and sealed from cavity 122) having a passage 154 fluidly connected to an interior of pressurized container 100. As illustrated, passage 152 communicates with a sealed chamber 156 between material 106 and closing member 110; however, sealed chamber 156 need not be present in all instances. Further, chamber 152 need not have the excess space surrounding piezoelectric component 150. Piezoelectric component 150 may be coupled to closing member 110 in any now known or later developed manner, e.g., glue, mechanical connection, formation of the material of closing member thereabout, etc. Piezoelectric component 150 may include any element that is capable of creating an electric potential in response to an applied mechanical stress, e.g., a crystal or a ceramic. In operation, piezoelectric component 150 is responsive to a pressure change in pressurized container 100 to power passive electronic sensor 120 and cause a change of the value of status register 126, as will be described herein. Powering of sensor 120 by antenna 146 is for reading of registers 126 and 138, and does not cause the same response in status register 126 as powering by piezoelectric component 150.

Referring collectively to FIGS. 2-4, embodiments of operation of closure 102 to determine whether closing member 110 has been tampered with will now be described. As shown in FIG. 3, closure 102 is initially inserted in opening 112 in pressurized container 100 in any known manner during manufacturing. During insertion, pressurized container 100 is pressurized from a low pressure $P_1$ (FIG. 3) to a higher pressure $P_2$ (FIG. 2). Sealed chamber 156 may be created in this process, or closure 102 may be configured to meet material 106 avoiding creation of sealed chamber 156.

In one embodiment of operation, sensor 120 may be configured to record an insertion of closing member 110 into opening 112 and any extraction of closing member 110 from opening 112 in status register 126, i.e., a status is stored. More specifically, when closing member 110 is initially inserted in opening 112, or re-inserted in opening 112 after having been removed, sensor 120 is powered by piezoelectric component 150 by the pressure change created by the insertion exerted thereon via passage 154. In this case, the pressure change would be an increase in pressure. Status register 126 records the insertion (re-insertion), e.g., by advancing status register 126 value by '1' for any insertion (re-insertion) operation, or storing some other status indicator. Consequently, a reading of status register 126 of passive electronic sensor 120 can be used to determine whether closing member 110 has been tampered with. More specifically, if the status in status register 126 indicates re-insertion, e.g., by a status counter being set to '2' rather than '1' (assuming the initial insertion is recorded by status register 126), then closing member 110 has been extracted and re-inserted, indicating pressurized container 100 has been tampered with. In addition, status register 126 may store a status indicating that closure 102 is new, e.g., a status counter of '0', prior to the initial insertion. In this case, upon initial insertion, status register 126 stores value '1'.

In another embodiment, as shown in FIG. 4, sensor 120 may also be powered by piezoelectric component 150 by the pressure change exerted thereon via passage 154 during an extraction of closure member 110 from opening 112. In this case, the pressure $P_2$ (FIG. 2) would shift to be a lower, extraction pressure $P_3$ (FIG. 4). Status register 126 records the extraction, for example, by advancing a status counter from '1' to '2' or storing some other status indicator. In this fashion, status register 126 records the insertion or the extraction each time piezoelectric component 150 senses a pressure change. Consequently, a reading a status of status register 126 of passive electronic sensor 120 can be used to determine whether closing member 110 has been tampered with, and the number of insertions and extractions thereof. More specifically, if status register 126 indicates any extraction, e.g., by a status counter storing a value higher than '1', then closing member 110 has been extracted and pressurized container 100 has been tampered with.

In another embodiment, identification register 138 stores a pressurized container identification that is to be identical to identification 104 (FIG. 1), the former of which may be encrypted with a private key of the manufacturer, e.g., an RSA private key. "RSA" is a widely known algorithm for public key encryption. Where encrypted, the pressurized container identification can be used with the manufacturer's public key to obtain an unencrypted identification for pressurized container 100. The pressurized container identification may take any form, e.g., a numeric or alphanumeric sequence. Where identification register 138 stores a pressurized container identification that cannot be decrypted or, if after decryption using the manufacturer's public key, the container identification does not match the identification 104 (FIG. 1) assigned to pressurized container 100, it indicates counterfeiting of pressurized container 100.

In an alternative embodiment, variations of the processes described above may be implemented to provide tampering detection in terms of material 106 changes and/or container counterfeiting. More particularly, reading of identification register 138 may include determining whether the pressurized container identification stored therein (after decryption) matches the identification assigned to pressurized container 100, and determining whether status register 126 stores a status indicator that extraction of closing member 110 has occurred.

Figure 5:
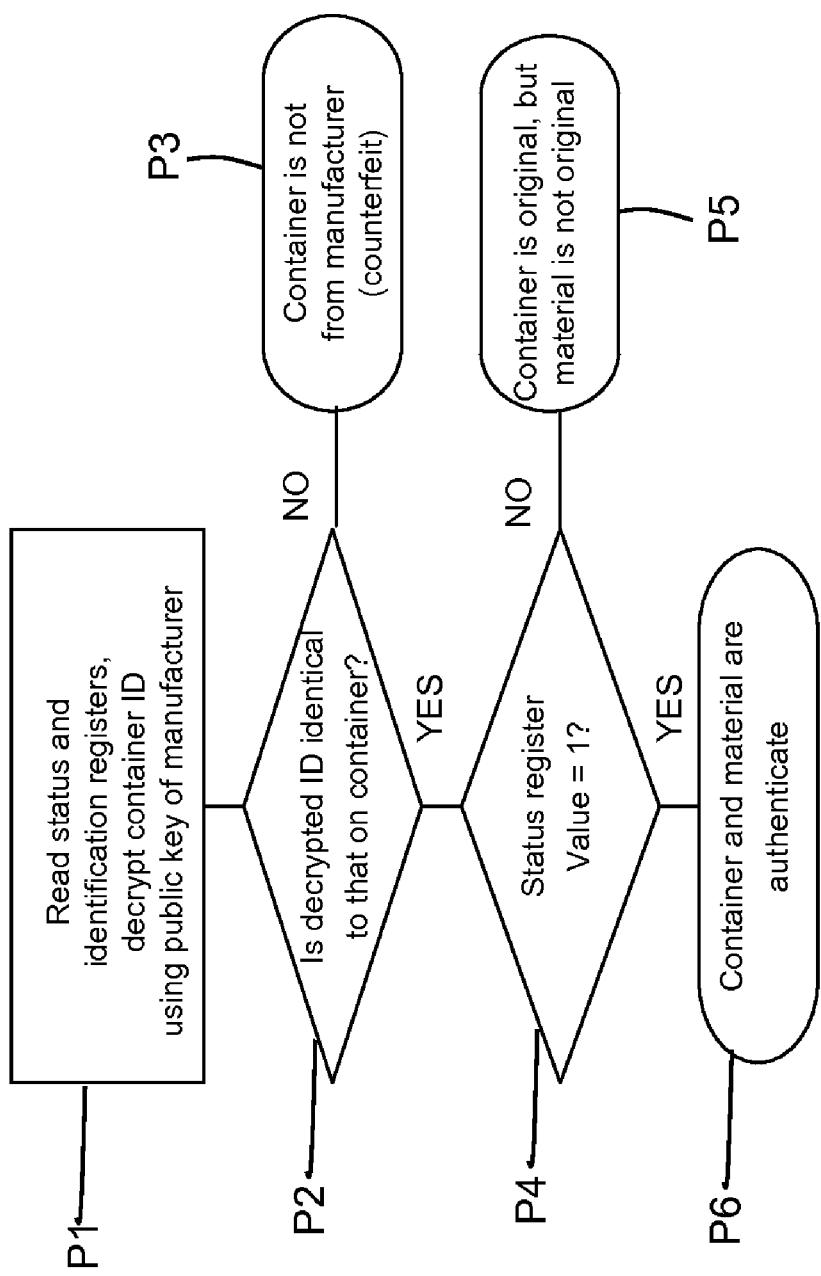
FIG. 5 shows a flow diagram of one embodiment of a method according to the invention.

FIG. 5 shows a flow diagram of one illustrative process that may be employed. In process P1, the pressurized container identification from identification register 138, and the value stored in status register 126 are read by RFID reader 130 in a known fashion, and the pressurized container identification is decrypted using the public key of the manufacturer. In process P2, a determination is made as to whether the pressurized container identification from identification register 138 (now decrypted) matches the container identification 104 (FIG. 1) on pressurized container 100. If the identifications do not match, i.e., NO at process P2, then at process P3, an indication of counterfeiting results. Similarly, although not shown, if the encrypted identification cannot be decrypted, then an indication of counterfeiting would result. If the identifications match, i.e., YES at process P2, then at process P4, a determination is made as to whether the status register 126 stores a value that is equal to '1'. If the status register 126 stored value is not '1', i.e., NO at process P4, at process P5, an indication that pressurized container 100 has been tampered and that material 106 is not original is made. If status register 126 stores a value of '1', i.e., YES at process P4, then, at process P6, pressurized container 100 is indicated has not having been tampered and therefore the container and material 106 are authenticate. That is, the stored value of '1' indicates that closure 102 has been inserted only once into opening 112, the initial insertion during manufacturing.

Although passive electronic sensor 120 has been described herein as an RFID tag based sensor, it is understood that other passive electronic sensors may also be possible. For example, instead of an electromagnetic interface (antenna and reader), the same internal logic but with an electrical interface allowing an appropriate tester to be plugged in to read the values of registers 126 and 138 may be employed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A closure comprising:
   a closing member for sealing an opening of a pressurized container; and
   a passive electronic sensor coupled to the closing member, the sensor including:
      a status register responsive to a pressure change in the pressurized container caused by at least one of an insertion of the closing member into the opening or an extraction of the closing member from the opening.

2. The closure of claim 1, wherein the sensor includes a radio frequency identification (RFID) processor readable by a RFID reader.

3. The closure of claim 1, further comprising an identification register for storing a pressurized container identification that is to be identical to an identification assigned to the pressurized container.

4. The closure of claim 3, wherein the pressurized container identification stored in the identification register is encrypted.

5. The closure of claim 1, wherein the sensor is powered by an antenna.

6. The closure of claim 1, wherein the sensor is powered by a piezoelectric component responsive to the pressure change in the pressurized container caused by the insertion of the closing member into the opening or the extraction of the closing member from the opening.

7. The closure of claim 6, wherein the status register records the insertion or the extraction each time the piezoelectric component senses the pressure change.

8. The closure of claim 6, wherein the sensor is positioned within a cavity within the closing member, and the piezoelectric component is positioned within a chamber having a passage fluidly connected to an interior of the pressurized container.

9. The closure of claim 1, wherein the sensor is positioned within a cavity within the closing member.

10. A method comprising:
    providing a closing member for sealing an opening of a pressurized container, the closing member including a passive electronic sensor coupled to the closing member, the passive electronic sensor including a status register;
    registering in the status register a pressure change in the pressurized container caused by at least one of an insertion of the closing member into the opening or an extraction of the closing member from the opening; and
    reading the status register of the passive electronic sensor to determine whether the closing member has been tampered with.

11. The method of claim 10, wherein the providing includes providing the sensor as a radio frequency identification (RFID) processor readable by a RFID reader.

12. The method of claim 10, wherein the providing further includes:
    providing an identification register for storing a pressurized container identification that is to be identical to an identification assigned to the pressurized container, and
    further comprising determining whether the pressurized container has been tampered by determining whether the pressurized container identification is identical to the identification assigned to the pressurized container.

13. The method of claim 10, wherein the reading includes powering the sensor using an antenna.

14. The method of claim 10, further comprising powering the sensor using a piezoelectric component responsive to a change in pressure in the pressurized container caused by an insertion or an extraction of the closing member from the opening.

15. The method of claim 14, wherein the registering occurs each time the piezoelectric component senses the change in pressure.

16. A closure comprising:
    a closing member for sealing an opening of a pressurized container; and
    a radio frequency identification (RFID) processor readable by a RFID reader, the RFID tag positioned within the closing member, the RFID processor including:
       a status register responsive to a pressure change in the pressurized container caused by at least one of a non-initial insertion of the closing member into the opening or an extraction of the closing member from the opening, and an identification register for storing a pressurized container identification that is to be identical to an identification assigned to the pressurized container.

17. The closure of claim 16, wherein the RFID processor is powered by an antenna.

18. The closure of claim 16, wherein the RFID processor is powered by a piezoelectric component responsive to the pressure change in the pressurized container caused by an insertion of the closing member into the opening or an extraction of the closing member from the opening.

19. The closure of claim 16, wherein the sensor is positioned within a cavity within the closing member, and the piezoelectric component is positioned within a chamber having a passage fluidly connected to an interior of the pressurized container.

20. The closure of claim 16, wherein the pressurized container identification stored in the identification register is encrypted.

* * * * *